United States Patent [19]

Yang et al.

[11] 4,200,790

[45] Apr. 29, 1980

[54] CLOSED-CHAMBER HIGH-PRESSURE GAS ION-FLOW ELECTRO-RADIOGRAPHY APPARATUS WITH DIRECT-CHARGE READOUT

[75] Inventors: Kei-Hsiung Yang; Jack D. Kingsley, both of Schenectady, N.Y.

[73] Assignee: General Electric Company, Schenectady, N.Y.

[21] Appl. No.: 972,453

[22] Filed: Dec. 22, 1978

[51] Int. Cl.² .............................................. G03B 41/16

[52] U.S. Cl. .............................................. 250/315.2

[58] Field of Search ........................ 250/315 A, 315 R

[56] References Cited

U.S. PATENT DOCUMENTS

| | | | |
|---|---|---|---|
| 4,064,439 | 12/1977 | Yang | 250/315 A |
| 4,103,159 | 7/1978 | Orthmann | 250/315 A |
| 4,129,779 | 12/1978 | Kingsley | 250/315 A |
| 4,147,948 | 4/1979 | Yang | 250/315 A |

*Primary Examiner*—Craig E. Church

*Attorney, Agent, or Firm*—Geoffrey H. Krauss; James C. Davis; Marvin Snyder

[57] ABSTRACT

A method and apparatus for ion-valve radiography, utilizing a high-pressure gaseous material for conversion of differentially-absorbed X-radiation into electrostatic charge images, utilizes a closed chamber and a charge-image-receiving mesh structure movable between an ion source and ion detection means, to provide direct charge readout without requiring opening of the imaging chamber.

10 Claims, 4 Drawing Figures

CLOSED-CHAMBER HIGH-PRESSURE GAS ION-FLOW ELECTRO-RADIOGRAPHY APPARATUS WITH DIRECT-CHARGE READOUT

BACKGROUND OF THE INVENTION

The present invention relates to X-ray imaging radiography and, more particularly, to a novel method and apparatus for high-pressure gas ion-flow electro-radiography utilizing direct charge readout of a charge image in a closed exposure chamber.

Conventional X-ray imaging techniques, typically using the screen-film system, are being replaced with electroradiography, whereby X-rays, differentially absorbed in an object under analysis, cause the deposition of an electrostatic charge image on an insulative sheet for subsequent development by electrophotographic techniques. The differentially-absorbed X-ray image may be converted into an electrostatic charge image, as is well-known in the art by use of high pressure gases, such as Xenon, Krypton and Freon 13B1, as the radiation-to-charge conversion material. Apparatus for providing radiographs using an ion-flow electron radiography technique, is described and claimed in pending U.S. patent application No. 942,548 filed Sept. 15, 1978, assigned to the assignee of the present invention and incorporated herein by reference. In the apparatus of the aforementioned application, the differentially absorbed X-radiation enters an exposure chamber through an upper electrode and is converted to electrical charge in a gaseous or liquid conversion material. The resulting charge is collected, under influence of an electrostatic field, upon the surface of an insulative layer, supported by a conductive mesh. The charge-image-bearing mesh structure is moved into an adjacent developing chamber, wherein ions are projected through the mesh structure towards an electrode spaced from the insulator layer portion of the mesh structure, for deposition of an ion image upon a dielectric sheet supported by the electrode. The mesh structure is moved back into the imaging chamber, which is subsequently filled with the conversion material, in preparation for a subsequent X-ray exposure. The dielectric film, having received the image-forming charge pattern, is removed from the developing chamber for subsequent development using electrophotographic techniques. The insertion and removal of the image-receiving dielectric film from the chambers containing high-pressure gas is difficult if loss of some quantity of the expensive conversion gas is to be prevented. Accordingly, a method and apparatus allowing the direct readout of the image-forming charge pattern, from a closed chamber containing a high pressure X-ray-to-electrostatic charge conversion gas, wherein the chamber is never opened and the expensive conversion gas is not lost, is highly desirable.

BRIEF SUMMARY OF THE INVENTION

In accordance with the invention, apparatus for the direct charge readout of a charge image, formed in a high-pressure gas chamber responsive to differentially-absorbed radiation, includes a hollow member having first, second and third chambers. The hollow member has a conductive front electrode and has an insulative rear member, in the areas of the first and second chambers, and a conductive rear member in the area of the third chamber, all sealed to one another in gas-tight fashion. A conductive mesh, supporting an insulative film, is surrounded by a radiation-conversion gas for causing a charge-image, of an object-to-be-analyzed, to be deposited upon the surface of the insulative layer during radiation exposure. After exposure, the charge-image-bearing mesh structure is translated through the second chamber, between an ion-projection source and a linear detector array, into the lower chamber. The ions projected towards the detector array are modulated by the charge pattern upon the intervening mesh structure, whereby a signal is recovered from each element of the detector array corresponding to the charge contained on the surface of each "island" of insulative material of the mesh structure then moved into position between the ion source and an associated element of the detector array; thus, a signal pattern directly related to the charge magnitude of the image is obtained.

Accordingly, it is one object of the present invention to provide novel apparatus for generating an electrical signal readout of an electrostatic radiation image produced in a permanently sealed high-pressure gas chamber.

It is another object of the present invention to provide a novel method for obtaining readout of an electrostatic X-ray image in a high-pressure gas chamber without requiring the chamber to be opened.

These and other objects of the present invention will become apparent upon consideration of the following detailed description, when read in conjunction with the associated drawings.

Figure 1:
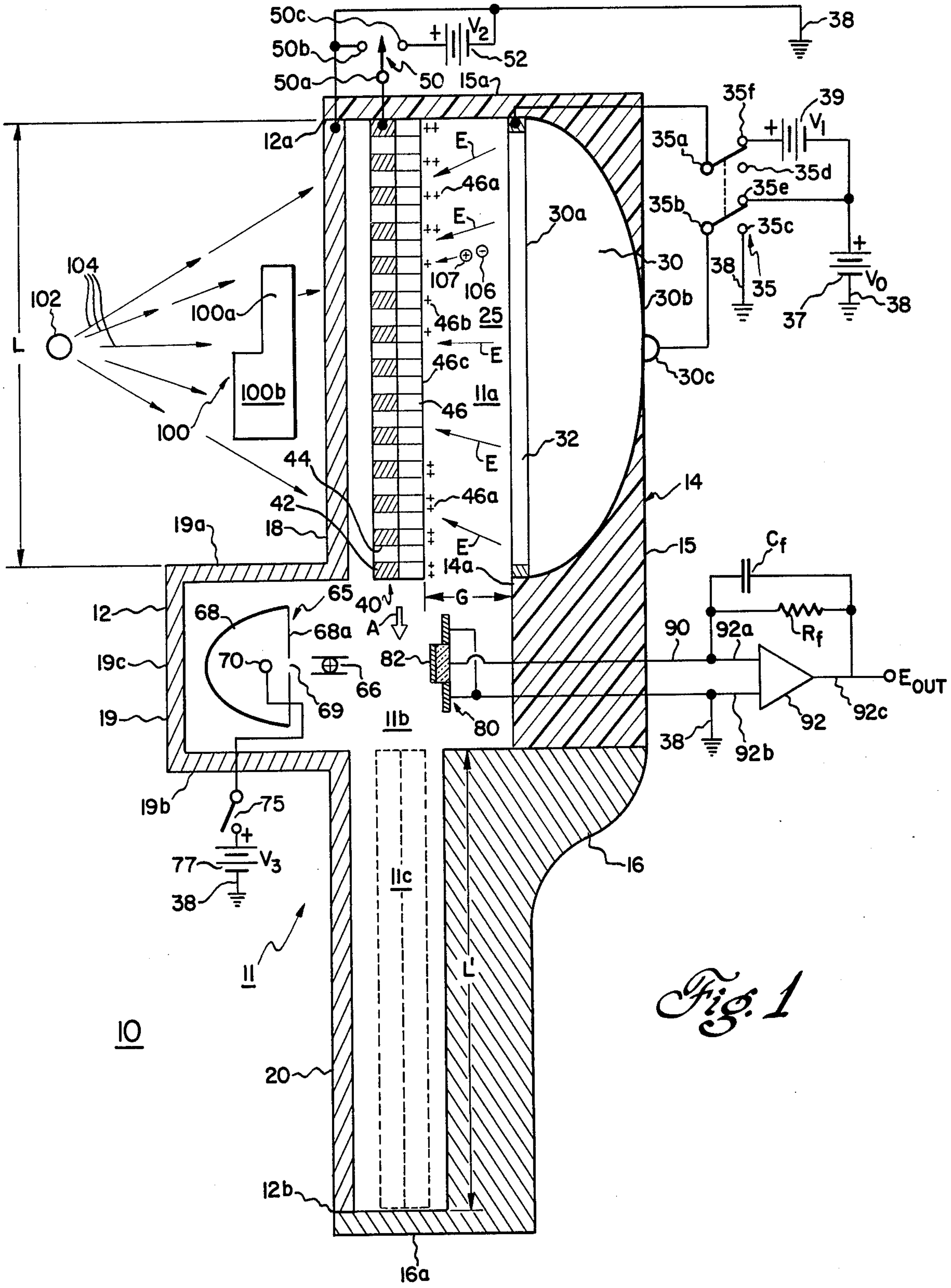
FIG. 1 is a sectional side view of one presently preferred embodiment of novel apparatus for the direct-charge readout of a charge image formed in a permanently sealed high-pressure gas chamber, and illustrating the principles of the present invention.
Figure 1A:
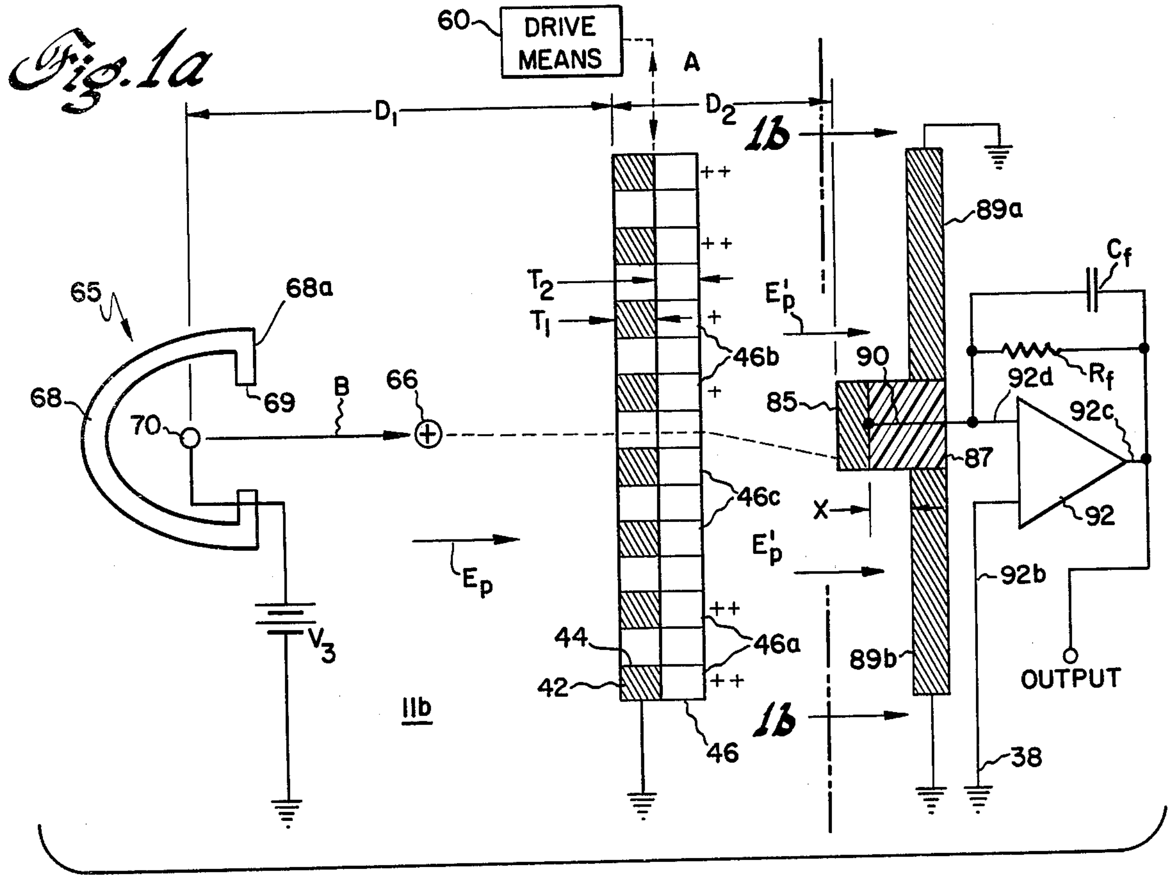
Figure 1B:
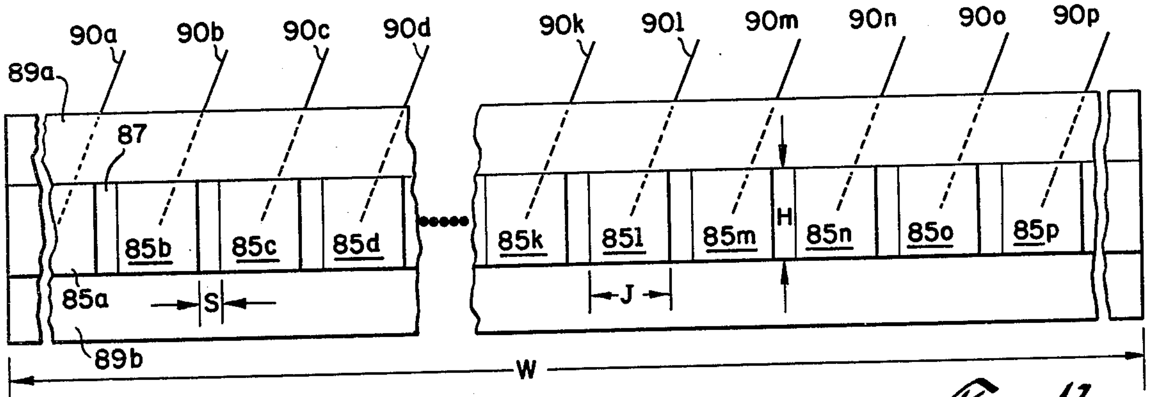
Figure 1C:
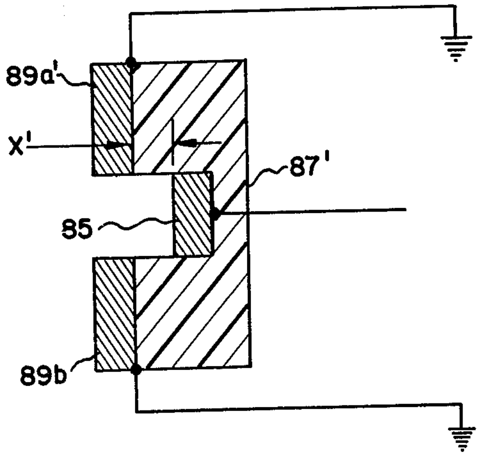

FIG. **1*a* is a sectional side view of the ion-projection direct-charge-readout elements in the middle chamber of the apparatus of FIG. 1**;

FIG. **1*b* is a front view of a detector array, taken in the direction of arrows 1*b*—1*b* of FIG. 1*a*; and FIG. 1*c*** is a sectional side view of an alternative detector array embodiment.

DETAILED DESCRIPTION OF THE INVENTION

Referring now to FIGS. 1, **1*a* and 1*b*, apparatus 10 for the direct-charge readout of an electrostatic radiation-responsive image includes a hollow member 11 having a front electrode 12 permanently sealed to a back member 14 having an upper insulative portion 15 and a lower conductive portion 16. The upper insulative member 15 has an insulative sideportion 15*a* permanently sealed in gas-tight fashion to one end 12*a* of the front electrode, while lower conductive back portion 16 has a conductive sideportion 16*a* permanently sealed in gas-tight fashion to the opposite end 12*b* of conductive front electrode 12. The sides of the chamber (not shown) are formed of parts of insulative upper back portion 14 and conductive lower back portion 15 extending to the edges of front electrode 12 and permanently sealed thereto in gas-tight fashion. Front electrode 12 includes an upper planar portion 18 integrally joined to a generally U-shaped center portion 19. Center portion 19 includes a pair of substantially parallel sidewalls 19*a* and 19*b* extending from an end portion 19*c* spaced generally parallel to the plane of upper electrode portion 18** and spaced therefrom in the direction away from back member 14. The end of center-portion wall 19*a*, furthest from endwall 19*c*, is integrally joined to upper front electrode portion 18. The end of center-portion sidewall 19*b*, farthest from endwall 19*c*, is integrally joined to a lower electrode portion 20 having a generally planar shape and positioned coplanar with upper electrode portion 18. Thus, it will be seen that hollow member 11 is divided into a first or upper chamber 11*a*, bounded by front electrode upper portion 18 and insulative rear electrode portion 15; a second or middle chamber 11*b*, bounded by front electrode central portion 19 and insulative rear electrode portion 15; and a third or lower chamber 11*c*, bounded by lower front electrode portion 20 and conductive lower back portion 16. The three communicating chambers 11*a*, 11*b* and 11*c* are filled with a gaseous material 25 characterized by the property of converting radiation quanta, absorbed within the gas, into charged particles. Gas 25 may be Xenon, Krypton, Freon 13B1 and the like, introduced into the communicating chambers of the hollow member under relatively high-pressure, typically on the order of ten atmospheres, and essentially permanently sealed therein.

Embedded in the insulative upper back portion 15 is a resistance member 30 having a substantially planar front surface 30*a*, substantially parallel to the planar upper front electrode portion 18, and having a curved rear surface 30*b*. An electrical contact 30*c* is placed at the center of the curved rear surface 30*b*. An annular electrode 32 is placed about the periphery of resistance member front surface 30*a*, and is connected to one common terminal 35*a* of a double-pole, double-throw switch means 35, having another pole common terminal 35*b* connected to the resistance member contact 30*c*. In a first position, switch means terminal 35*b* is coupled to a first selectable output terminal 35*c* coupled to electrical ground potential, while common terminal 35*a* is coupled to a first selectable output terminal 35*d* providing an open circuit. In the remaining switch position, switch means common terminal 35*b* is coupled to a second selectable output terminal 35*e* having a positive potential of $V_0$ volts, with respect to ground, supplied thereto by a first potential source 37 coupled between switch terminal 35*e* and electrical ground 38. Switch terminal 35*a* is coupled, in the second switch position, to a second selectable output contact 35*f*. A second source 39 of electrical potential is coupled between the switch terminals whereby switch terminal 35*f* is at a positive potential of $V_1$ volts greater than the potential at switch terminal 35*e*.

A mesh structure 40 includes a conductive mesh 42 having a multiplicity of microscopic apertures 44 formed therethrough. A layer 46 of insulating material is fabricated upon the solid portions of mesh 42, whereby the multiplicity of apertures 44 extend, in registration, through the mesh and insulated layer of mesh structure 40. The mesh structure is initially positioned within upper chamber 11*a* with conductive mesh 42 closest to and insulated from front upper electrode portion 18 and generally parallel thereto. The mesh structure is so positioned, when situate in the upper chamber, as to be spaced from both front upper electrode portion 18 and the planar forward surface 14*a* of the back member. The mesh structure is movable in the direction of arrow A, through the central chamber 11*b*, into the lower chamber 11*c*.

A single-pole, double-throw switch means 50 has its common terminal 50*a* connected to conductive mesh 42 and has one selectable output terminal 50*b* coupled to conductive front electrode 12 and to electrical ground 38. The remaining selectable output terminal 50*c* is coupled to a third potential source 52, which imparts a positive potential of magnitude $V_2$ at switch terminal 50*c*.

Typically, the gap distance G between the facing surfaces of upper front electrode portion 18 and rear insulative portion surface 14*a* is on the order of one centimeter, with metal mesh 42 and insulative layer 46 having respective thicknesses $T_1$ and $T_2$ of between about two microns and about one hundred microns. Typically the metal mesh will have between about 100 and 2,000 line-pairs per inch with the size of apertures 44 being selected to give a mesh transmission of between about 20% and about 80%. The mesh is advantageously fabricated of a conductive metal having relatively high strength, which metal may be copper, nickel, iron and chrome. Metallic alloys, such as stainless steel and the like, may be utilized and other conductive or semi-conductive materials may be used for the mesh, as long as the resistivity of the conductive mesh material is less than about $10^9$ ohms-centimeter. The material of insulative layer 46 may be an inorganic material such as silicon dioxide or glass, or may be an organic material, such as polystyrene, polyester resins, polyprophylene resins, polycarbonate resins, acrylic resins, vinyl resins, epoxy resins, polyethylene terephthalate and polyfluoride resins, and polydiphenyl siloxane. Similar materials may be utilized, as long as the resistivity of insulating layer 46 is greater than about $5\times10^{15}$ ohms-centimeter. The dimensions of the planar mesh are determined by the exposure size to be utilized. Thus, where apparatus 10 is to be utilized for obtaining an image of the human chest, which images have a somewhat standardized format of 17" high by 14" wide, the length L of the upper front electrode portion 18 is approximately equal to the image height (17") with the length of mesh structure 40, in the same direction, being approximately equal, but never less than, dimension L. Similarly, the dimension of upper front electrode portion 18 and mesh structure 40 in the direction into and out of the plane of the drawing is at least 14", to allow the 14" width of the image to be obtained.

It should be understood that the mesh structure may also utilize a woven wire base or a foraminate metal layer upon which the insulating layer may be fabricated by spray-coating or by vacuum deposition dependeng upon the chosen insulative material. Typically, the mesh has between about 100 and about 2000 strands per inch, with an open aperture transmission of between about 20% and about 80%. The mesh is typically between about 2 microns and 100 microns thick.

Apparatus 10 also includes drive means 60 (FIG. 1*a*) for linearly translating mesh structure 40 in the direction of arrow A, between its initial position within upper chamber 11*a*, linearly and within the plane of the mesh structure, through central chamber 11*b* to a temporary rest position (shown in broken line in FIG. 1) within lower chamber 11*c*. The drive means also returns the mesh structure from the lower chamber 11*c*, through central chamber 11*b*, to the initial mesh structure position within 11*a*. Drive means 60 may be an electric drive mechanism internally sealed within hollow member 11, or the translation of mesh structure 40 may be accomplished by magnetic coupling to the relatively light-weight mesh structure, with a magnetic coupling mechanism positioned outside hollow member 11.

A source 65 of ions 66 is positioned within the generally U-shaped protrusion 19 of central chamber 11*b*. Advantageously, source 65 is a corotron having a housing 68, elongated into and out of the plan of the drawing, and having a generally semicircular cross section with the flat surface 68*a* thereof facing toward the rear of the member and having a slit aperture 69 formed therein extending into and out of the plane of the drawing. Within the volume of member 68 is positioned a tensioned elongated corona wire 70, extending parallel to slit aperture 69. Corona wire 70 is coupled to a switch means 75 for selectively energizing of the corona wire with a positive potential of magnitude $V_3$ volts, with respect to electrical ground potential 38, from a fourth potential source 77.

A linear array 80 of detectors 82 are positioned adjacent the surface 14*a* of rear insulative portion 14 forming the rear wall of central chamber 11*b*. The detector array is an elongated "one-dimensional" array extending into and out of the plan of the drawing. The elongated dimension W of the array (FIG. 1*b*) is at least as great as the width of the image to be generated, e.g. at least 14" for a 14" wide chest X-ray. Each individual detector element 82 of array 80 includes a detector probe 85 formed of a flat conductive member placed parallel to the plane of the translation direction A. The linear array of detector probes 85*a*–85*p* are co-planar and supported upon a member 87 of insulative material. The probe electrodes 85 and the insulative member 87 have a height H and the probe electrodes have a width J; both H and J are determined by the required resolution. In one preferred embodiment, the detector probes are substantially square and have identical heights and widths of about 0.015 centimeters. The individual detector probes are insulated from each other by providing a spacing S between adjacent edges of adjacent detector probes, with the spacing being generally less than the width J of any one detector probe. One of a pair of elongated conductive guard plates 89*a* and 89*b* is placed respectively above and below the probe-supporting insulative member 87. In order to avoid a possible buildup of charge either between adjacent ones the linearly arrayed plurality of detector probes 82 or between the detector probes and the guard plates, the detector probes either protrude in front of the co-planar guard plates, by a distance x (FIG. 1*a*), or are recessed behind the parallel and co-planar guard plates 89*a'* and 89*b'* by a distance x' (FIG. 1*c*); if detector probes 85 are recessed behind the guard plates, then insulative member 87' may be extended to support the guard plates from the rear, rather than from the sides as in FIG. 1*a*. The distance x, or x', by which the detector probes 85 protrude, or are recessed, beyond the plane of the guard plates will be relatively small in comparison to the distance $D_2$ between the plane of the mesh structure, during translation thereof past the detector array, and the plane of the detector probes. Typically, with the corona wire 70 of the ion source 65 spaced at a distance $D_1$, preferably of about 3.75 centimeters, from the translational plane of the mesh structure, the detector probe plane will have a distance $D_2$ on the order of 0.2 centimeters from the mesh structure translational plane. Both guard plates 89*a* and 89*b* (and plates 89*a'* and 89*b'* of the recessed probe embodiment of FIG. 1*c*) are connected to electrical ground potential. Each of detector probes 85*a*–85*p* has a separate lead 90*a*–90*p* for coupling the detector probe to one input 92*a* of an associated one of a like plurality of current-measuring operational amplifiers 92 (FIG. 1). A remaining input lead 92*b* of each operational amplifier is coupled to ground 38 and the operational amplifier output 92*c* is connected, via an electrically-paralleled combination of a feedback resistance $R_f$ and a feed-back capacitance $C_f$ to the input 92*a* coupled to the associated detector probe 85. Typically, $R_f$ is about 10 Meg ohms and amplifier 92 is an operational amplifier, such as a National Semiconductor Corp. Type LF 356H. An output signal voltage $E_{out}$ appears at the output 92*c* of each operational amplifier, responsive in magnitude to the amount of charge received at the associated one of detector probes 85*a*–85*o*. It should be understood that other circuitry means, including integrated circuitry, can be equally as well used to measure the ion current.

In operation, an object 100 to be analyzed is positioned between upper front electrode 18 and a source 102 of radiation. Typically, source 102 is an X-ray tube and may be considered a point source of X-rays 104 diverging towards object 100 and hollow member 11. A portion of X-rays 104 will pass outside of the boundaries of object 100 and will arrive at upper front electrode portion 18 without attenuation. Others of X-ray quanta 104 will pass through object 100 and will be absorbed to a greater or lesser degree, dependent upon the thickness and density of the object portion through which the quanta pass. It will be seen that X-rays passing through a relatively thin portion 100*a* of the object will be relatively less attenuated, upon arrival at upper front electrode portion 18, relative to the attenuation of X-ray quanta transmitted through a relatively thick and/or dense portion 100*b* of the object to be analyzed. For purposes of explanation, it is assumed that all X-ray quanta impinging upon object portion 100*b* are absorbed therein, whereby no radiation reaches the area of upper front electrode portion 18 shadowed by object portion 100*b*.

The differentially-absorbed radiation passes through upper front electrode portion 18, which is fabricated of a low atomic number element, such as aluminum and the like, to reduce X-ray absorption therein. The differentially absorbed radiation passes through the mesh structure and the radiation quanta enter the gas of chamber 11*a*; the gas, which may be Xenon at 10 atmospheres, with a gap G of 1 centimeter, absorbs the radiation quanta and emits charged particles, such as negatively charged electrons 106 and positively charged ions 107, responsive to absorption of radiation quanta.

Prior to the start of X-ray exposure, switch means 50 has been positioned to couple potential source 50*b* to the conductive mesh 42 of the mesh structure, whereby the mesh is at electrical ground. Switch means 35 has been positioned to couple potential source 37 to the resistance member contact 30*c* and to couple potential source 39 between the annular contact ring 32 and the resistance member contact. The resistance member, in conjunction with its annular electrode and potential sources 37 and 39, forms concentrate circular equipotential rings upon the surface 30*a* of the resistance member such that an electric field E is formed directed from the resistance member to the mesh structure and converging toward radiation source 102. Field E causes positive ions 107 to move to insulative layer 46 and be collected thereat. It should be understood that negative ions 106 may be equally as well utilized if the polarity of all of potential sources 37, 39, 52 and 77 are reversed. The formation of concentric circulation equipotential rings is necessary to eliminate geometric unsharpness caused by the high-pressure gas gap and assure that ions 107 provide charge "islands," at the insulative layer, in positions relating to the positions of the features of the object to be studied. The back member-mounted device for forming the concentric circularly equipotential rings may be as shown, and as more fully explained in the afore-mentioned pending application, Ser. No. 942,548, or may be of the type described in U.S. Pat. Nos. 3,859,529; 3,927,322 or 3,961,192.

The charged particles, produced responsive to absorption of the radiation, as collected at insulative layer 46 of the mesh structure in patterns reproducing the radiation absorption characteristics of the object 100 being analyzed. Those of X-ray quanta 104 passing beyond the boundaries of the object are unattenuated and produce a relatively large number of charges at the insulative layer surface, e.g. at charge "islands" 46*a*. The X-ray quanta passing through object section 100*a* are somewhat, but not completely, attenuated and produce correspondingly smaller amounts of charge for collection at other portions (or "islands") of the insulative layer, e.g. at charge "islands" 46*b*. The X-ray quanta passing through object section 100*b* are assumed completely absorbed and, accordingly, do not produce charge particles for collection at those portions of the mesh structure insulative layer, e.g. uncharged "islands" 46*c*, which are shadowed by object section 100*b*. Illustratively, for a 1 milli-Roentgen exposure with 60keV. X-rays, the average charge density of the charge image on the surface of the insulative layer of the mesh structure, is on the order of three nanocoulombs per square centimeter ($nC/cm^2$). The maximum charge density of the image is in those charge-islands 46*a* receiving the unattenuated X-rays and is about 5.4 $nC/cm^2$. The minimum charge density of the charge image is at those charge-islands 46*c* devoid of charge and is on the order of $0.6nC/cm^2$.

Upon completion of deposition of the charge-image upon mesh structure 40 responsive to X-ray exposure, the X-ray source is turned off and switch means 35 and 50 are operated to their remaining positions; the resistive member center contact 30*c* is grounded through switch means terminals 35*b* and 35*c*, while an open circuit is placed on annular back electrode 30*a*, via connection of switch means terminal 35*a* to open circuit terminal 35*d*, and switch means common terminal 50*a* is coupled to switch means output terminal 50*c*. The front electrode 12 is insulated from the conductive mesh 42 of the mesh structure.

The charge-image-bearing mesh structure is now linearly translated downwardly in the direction of arrow A. Each line of the charge-islands, formed by a line of insulative layer portions extending into and out of the plane of the drawing, passes simultaneously between the ion projection source 65, linearly extended into and out of the drawing plane, and the linear array 80 of detectors 82. Ions 66, of like polarity to the polarity of charged particles 107 collected upon the insulative layer 46 of the mesh structure, are projected from the ion source towards the passing mesh structure. The ion stream is relatively narrow in the plane of the drawing, and extends into and out of the plane of the drawing. When the ion stream impinges upon solid portions of mesh 42, the ions are collected by the conductive mesh. When ions 66 impinge upon one of the line of mesh apertures 44 then located between the ion source slit 69 and the line of detectors 82, the magnitude of the ion stream passing through the mesh structure apertures is controlled by the magnitude of the charge in the charge-islands surrounding each aperture through which the ion stream passes. Thus, when the ion stream passes through one of apertures 44 bounded by charge-island 46*a* of relatively large charge magnitude, the like-charge repulsion between the positively-charged ions 66 and the positive charges of islands 46*a* allow a relatively small flow of ions 66 through that mesh aperture 44, whereby the amount of charge received at the associated detector probe 82 is relatively small and causes the probe output voltage $E_{out}$ to be relatively low. When mesh structure 40 has moved downwardly, in the direction of arrow A, to allow ions 66 to move through those of mesh apertures 44 bounded by other charge-islands 46*c* having little or no charge thereat, there is substantially less like-polarity repulsion and all of the charged particles 66 entering apertures 44 pass therethrough and impinge upon the associated detector probe 82; the magnitude of the detector output voltage $E_{out}$ is relatively large. As mesh structure 40 continues to move downwardly, the projected ions 66 enter others of apertures 44 bounded by islands 46*b* having moderate charge surrounding the mesh aperture. The like-polarity interaction is relatively weak and a portion of the charged particle stream is transmitted through those apertures in the mesh structure to an associated detector probe to provide a moderate (average) output voltage at amplifier output terminal 92*c*. Thus, the current from a detector probe 82, and the associated amplifier output voltage, is modulated by the magnitude of the charged particles deposited at mesh structure insulative layer 46 responsive to absorption of radiation quanta in the object to be analyzed. Accordingly, the outputs of all of the detector probe-amplifier combinations are available simultaneously for storage and/or display of one line of the radiation-responsive image formed of a multiplicity of lines, equal to the multiplicity of lines of apertures in mesh structure 40.

The mesh structure continues moving downwardly until the entire mesh structure has entered lower chamber 11*c* and has passed between ion source 65 and detector array 80, whereupon the entire charge image stored upon the mesh structure insulative layer has been read out by ion stream interrogation and conversion into detector current. The ion projection apparatus is de-energized by opening switch means 75 and mesh structure 40 is moved linearly upwardly to its initial rest position within chamber 11*a*, to prepare for the next subsequent radiation exposure. The previous image may be erased by exposing the upper chamber to X-rays 104 without the presence of an object, or patient, 100 to be analyzed, to produce ions and electrons in the high-pressure gas 25 which will annihilate the previous charge image. This is accomplished while the mesh structure is maintained at ground potential. Alternatively, any other method which generates a neutralizing charge at the mesh structure insulative layer may be utilized to erase the image and prepare for the next radiological examination.

The resulting electral signal pattern, generated by the direct-charge readout of the charge-image, has a total resolution of about seven line pairs per millimeter, due to the mesh structure resolution of about 40 line pairs per millimeter, the resolution due to collecting positive ions of about 10 line pairs per millimeter and the ion projection resolution of about 40 line pairs per millimeter. This resolution is satisfactory for examination of human patients, especially with the desirable maximum radiation dosage of 1 milli-Roentgen. This advantageous result is obtained with the apparatus 10 remaining substantially permanently sealed, whereby the relatively expensive conversion gas 25 need not be moved into, and out of, the exposure chamber.

While one preferred embodiment of our novel apparatus has been described in detail herein, many variations and modifications will now become apparent to those skilled in the art. For example, it is well-known that corona unit 68 can be easily operated at a gas pressure of one atmosphere. The translation of mesh structure 40 is easier when the gas pressure is reduced to 1 atmosphere in chamber 11. This can be accomplished by connecting chamber 11 to a hydraulic pressure-controlling chamber so that, during the X-ray exposure, the gas pressure in chamber 11 is 10 atmospheres, and, during the translation of the mesh and energization of the corona source, the gas pressure is reduced to 1 atmosphere. As another example, it is also known that a uniform background charge can be deposited on the surface of the insulating layer of the mesh 40 by a corona unit (not shown in the figures) before the X-ray exposure. After the X-ray exposure, the charge density on the insulating surface of the mesh 40 is the sum of X-ray generated charges and the uniform background charges; ion projection through such a pre-charged charge-controlling mesh is desirable for certain applications. It is our intent, therefore, to be limited only by the scope of the appending claims, and not by the specific details set forth herein.

What is claimed is:

1. Apparatus for providing an image of radiation differentially-absorbed by an object, comprising:

a hollow member having first, second and third chambers in communication with one another;

a conductive electrode forming a front portion of at least said first chamber and receiving said differentially-absorbed radiation for transmittal therethrough into said first chamber;

a rear electrode positioned in said first chamber and substantially parallel to said front electrode and spaced therefrom in a direction away from the direction of radiation incidence;

a mesh structure initially disposed within said first chamber between said front and rear electrodes at a preselected gap distance from said rear electrode, said mesh structure being movable through said second chamber into said third chamber, said mesh structure comprising a substantially planar conductive member having a multiplicity of apertures formed therethrough; and an insulative layer supported upon a surface of said conductive member furthest from said first chamber front electrode and having a like multiplicity of apertures formed therethrough, each in registration with an aperture formed in said conductive member;

a gas filling the communicating chambers of said hollow member, said gas being characterized by absorption of quanta of said radiation and conversion of the absorbed quanta into electrically charged particles;

means coupled between at least the conductive member of said mesh structure and said first chamber rear electrode for forming an electric field in the gap therebetween for depositing the electrically charged particles formed within the gas gap, responsive to absorption in the gas of quanta of the differentially-absorbed radiation, at the insulative film with a charge pattern of a first polarity and representative of the radiation absorption characteristics of the object irradiated;

means positioned in said second chamber for directing a stream of ions of said first polarity toward said conductive member and thence through each aperture of said mesh structure for modulation of said ions by the like polarity charge deposited upon said insulative film and surrounding each said aperture; and means for detecting the modulated ion stream emerging from each aperture of said mesh structure to provide an electrical signal of magnitude responsive to the radiation absorption characteristic of an associated portion of the object being irradiated.

2. The apparatus as set forth in claim 1, wherein said mesh structure apertures are arranged in a rectangular matrix with a plurality of lines of apertures; each entire line of apertures being sequentially and simultaneously positioned between said ion directing means and said detecting means as said mesh structure is moved through said second chamber.

3. The apparatus as set forth in claim 2, wherein said detecting means comprises a plurality of detector probes positioned to form an elongated detector array in a first direction substantially parallel to the plane of said mesh structure and substantially transverse to the direction of movement of said mesh structure; each of said plurality of detector probes receiving the modulated ion stream from an associated one of the plurality of mesh structure apertures then positioned between said ion directing means and said detecting means.

4. The apparatus as set forth in claim 3, wherein said detecting means further comprises a pair of guard plates positioned parallel to the elongated direction of said plurality of detector probes.

5. The apparatus as set forth in claim 4, wherein said pair of guard plates are co-planar.

6. The apparatus as set forth in claim 5, wherein said co-planar guard plates are positioned closer to said mesh structure than the plane of said plurality of detector probes.

7. The apparatus as set forth in claim 5, wherein said co-planar guard plates are positioned further from said mesh structure than the plane of said plurality of detector probes.

8. The apparatus as set forth in claim 3, further comprising a plurality of current-measuring amplifiers, each amplifier having an input connected to an associated one of said plurality of detector probes and an output at which a signal is present with magnitude responsive to the magnitude of said charge-image surrounding the associated aperture of said mesh structure line then positioned between said ion directing means and said associated probe.

9. The apparatus as set forth in claim 1, wherein the lines of said electric field of a shape selected to compensate for charge image distortion caused by the gas-filled gap.

10. The apparatus as set forth in claim 9, wherein said rear electrode generates concentric circular equipotential lines in said gas-filled gap to compensate for charge-image geometric unsharpness.

* * * * *